Feb. 12, 1935.   A. S. HAISLIP   1,991,149
TRANSPORTING AQUARIUM FOR AQUATIC ANIMALS
Filed Oct. 6, 1932   3 Sheets-Sheet 1
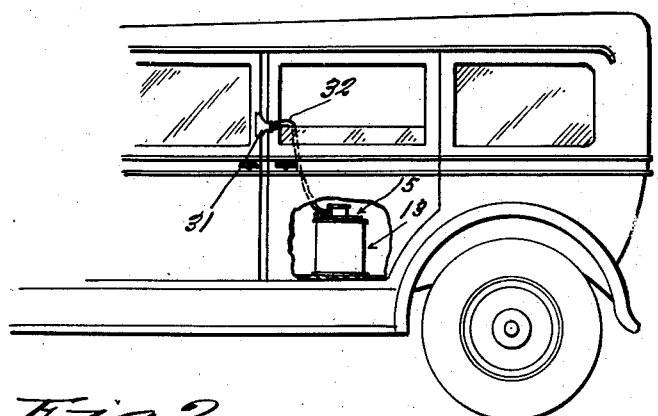
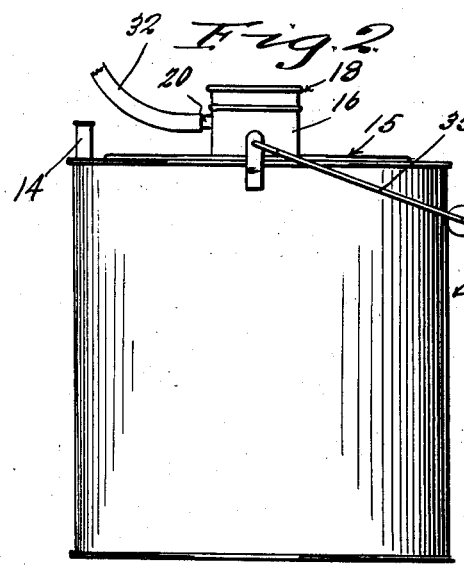
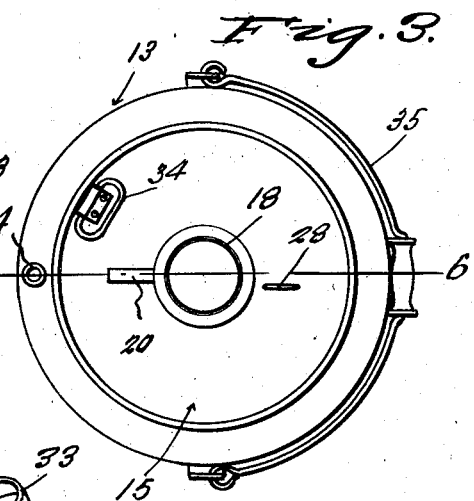
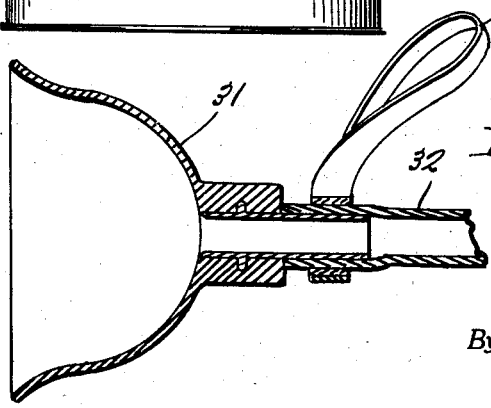
Inventor
Albert S. Haislip
By Clarence A. O'Brien
Attorney Feb. 12, 1935.  A. S. HAISLIP  1,991,149
TRANSPORTING AQUARIUM FOR AQUATIC ANIMALS
Filed Oct. 6, 1932  3 Sheets-Sheet 2
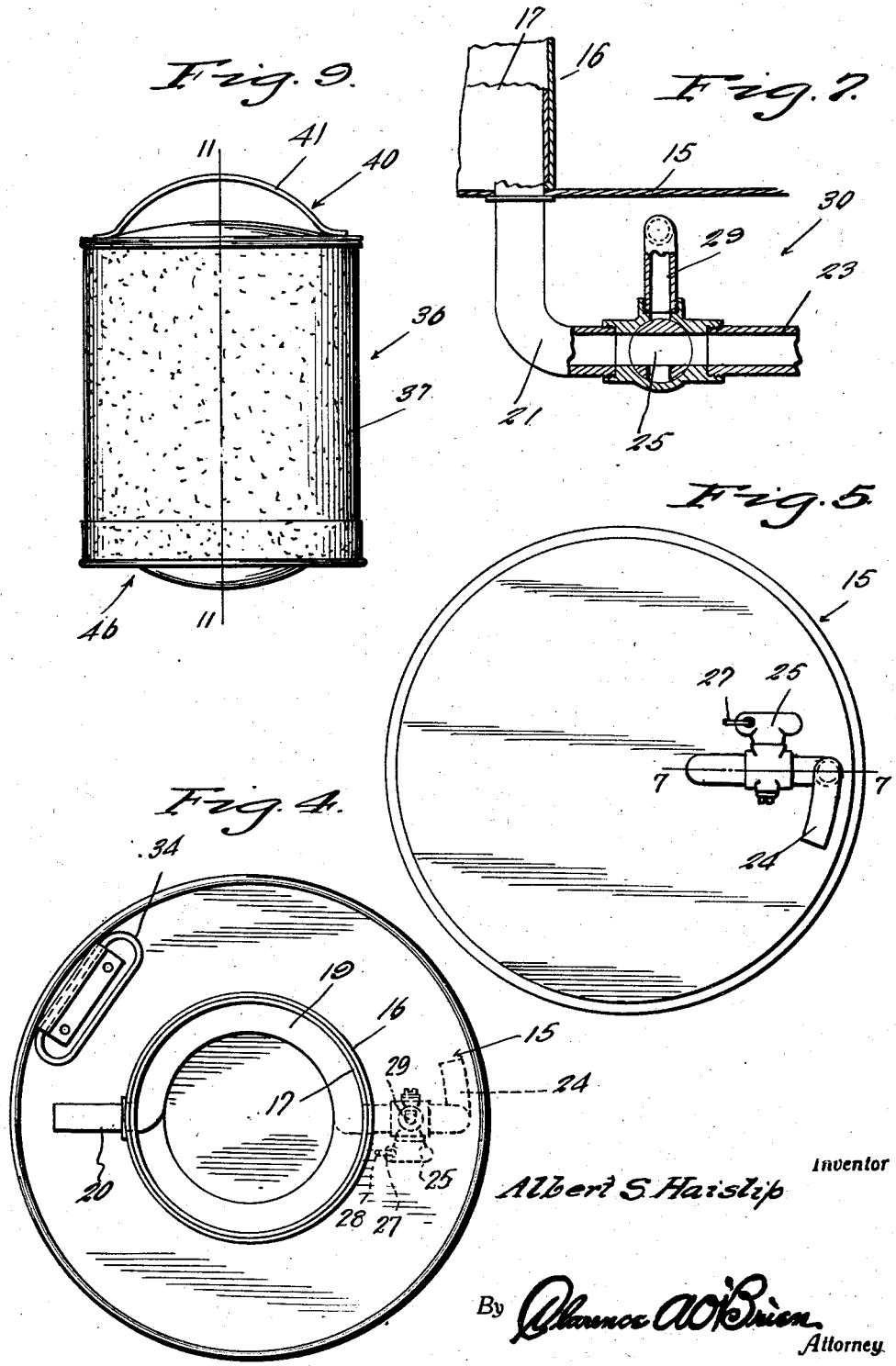

Feb. 12, 1935.  A. S. HAISLIP  1,991,149
TRANSPORTING AQUARIUM FOR AQUATIC ANIMALS
Filed Oct. 6, 1932   3 Sheets-Sheet 3
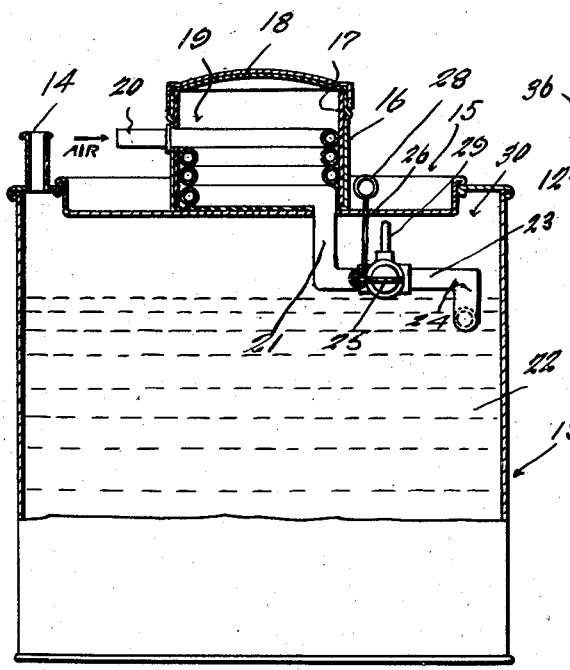
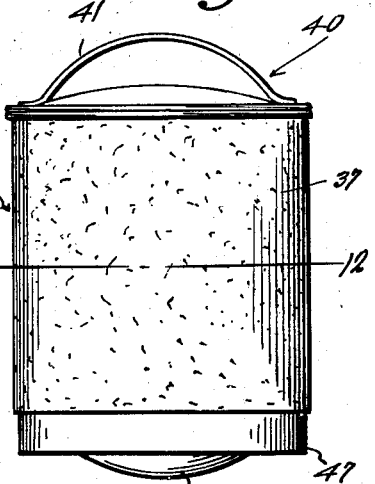
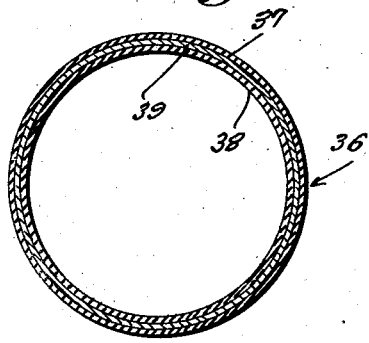
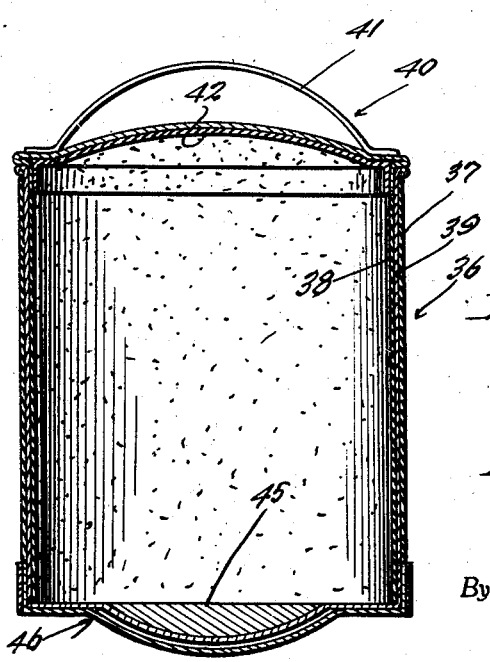
Inventor
Albert S. Haislip
By Clarence A. O'Brien
Attorney Patented Feb. 12, 1935

1,991,149

UNITED STATES PATENT OFFICE 1,991,149

TRANSPORTING AQUARIUM FOR AQUATIC ANIMALS

Albert S. Haislip, Fredericksburg, Va.

Application October 6, 1932, Serial No. 636,553

6 Claims. (Cl. 43—56)

This invention relates to a novel and unique container or aquarium for temporary maintenance of aquatic animals such as live fish, bait minnows, frogs, and the like, designed primarily for transporting such creatures from place to place.

The preferred embodiment of the invention as pictorially exemplified in the illustrative drawings is in the nature of a suitably proportioned bucket or equivalent container having adequate facilities to accommodate bait, fish and the like while in transit.

Experts familiar with facts concerning the preservation of live fish while in transit agree that in order to keep them alive and active for commercial and other purposes, it is essential that the water in the container be appropriately oxygenated and relatively cool. Otherwise, the animal cannot endure the fate of captivity in limited quarters and will die before the destination is reached.

Heedful of these prerequisites in the temporary maintenance of the aforesaid varieties of water creatures, and aware of the need for a practical device for ordinary fishermen's use, I have evolved and produced a contrivance which I believe, will fulfill the requirement to the extent that it constitutes an achievement in this line of endeavor.

What I have in mind is a practical and up-to-date contrivance characterized by requisite facilities and capacity for transporting live bait and fish in one's automobile.

An exclusive and distinguishing feature of the invention is found in the provision of effective and positive means for simultaneously cooling and aerating the water in the container, whereby to render it suitable and satisfactory for maintenance of fish, bait and the like.

In carrying the inventive conception into actual practice, I have discovered an arrangement of mutually co-ordinated details including successful means for conditioning and charging the water with air so that the fish may temporarily inhabit the container for a reasonable period of time, sufficient to permit the fish to be kept in an animated state while fishing and thereafter transported in the fisherman's automobile from the water's edge to the home.

Other features and advantages of the invention will become more readily apparent from the following description and drawings.

In the drawings:

Figure 1 is a fragmentary side view of an automobile showing the manner in which the contrivance is placed in an automobile.

Figure 2 is a side elevational view of the container or aquarium as constructed in accordance with the principles of the present invention.

Figure 3 is a top plan view of Figure 2.

Figure 4 is an enlarged top plan view of the special lid or cover and its air conditioning and cooling coil.

Figure 5 is a bottom plan view of the cover shown in Figure 4.

Figure 6 is an enlarged sectional view taken approximately on the plane of the line 6—6 of Figure 3.

Figure 7 is a fragmentary detail view in section showing a valved by-pass for the incoming air currents, the section being on the line 7—7 of Figure 5.

Figure 8 is an enlarged sectional view showing the air intake funnel or cup.

Figure 9 is a detail elevational view of a buoyant cartridge designed for temporary use during the period of fishing and placing the resultant catch in the container.

Figure 10 is a view like Figure 9 showing the bottom cap removed.

Figure 11 is a central longitudinal sectional view taken approximately on the plane of the line 11—11 of Figure 9, looking in the direction of the arrows.

Figure 12 is a horizontal section on the line 12—12 of Figure 10.

By way of introduction it is to be stated that I have used the term "aquarium" in the broad sense that it comprehends any suitable sort of a container, tank, or equivalent structure, irrespective of size, shape and proportion, in which the fish may be temporarily placed and transported. This is due to the fact that the inventive conception comprehends an arrangement which may be in the form of a transportation truck with the cooling and aerating means built into it, a tank car, or the like. It is believed however that reference to the specific embodiment of the invention illustrated in the drawings will be sufficient to acquaint the reader with the principal features of novelty.

Referring now to the form of the invention illustrated in the accompanying drawings, wherein like numerals are employed to designate like parts throughout the same, it will be observed that the aquarium is here shown in the form of a bucket 13 of appropriate material and proportion. The bucket in mind would be somewhat larger than the ordinary bait bucket, or of any suitable capacity for convenient use by an ordinary fisherman.

In its top the bucket is provided with a trapped air discharge vent 14 and a central opening to accommodate the receptacle-like cover 15. The cover is formed centrally with a cup 16 of appropriate capacity having a suitable heat insulation lining 17 and an appropriately lined removable lid 18. This cup is adapted to contain a charge of dry ice.

Located in the cup is an air circulating and cooling coil 19 whose intake branch is formed with a nipple 20 protruding through the wall of the cup. The lowermost coil is provided with a depending branch 21 extending down into the water 22 in the bucket. Then at 23 the pipe terminates in an air discharge nozzle 24 submerged in the water. The numeral 25 merely designates a cut-off valve and 26 represents an operating push-pull rod having an eye 27 connected to the finger piece of the valve and a similar eye or ring 28 at its upper end located on the exterior of the cover 15 to permit the valve to be conveniently turned off and on.

As seen in Figure 7, there is a by-pass pipe 29 associated with the valve. The reason for providing this valve is so that the air may be turned off or on. When the valve is open obviously the air rushes into the water, being injected by way of the nozzle 24. When the valve is closed the air is by-passed into the space 30 above the normal water level and circulated through the vent 14. It is obvious that in order to feed the air under pressure into the water it is necessary that the automobile be driven at a speed sufficient to develop the necessary air pressure. Ordinarily sufficient air will be developed for introduction when driving at a speed greater than thirty-five miles per hour. Obviously such speed cannot be maintained in city limits and confused traffic. Therefore, when compelled to drive slow the valve is turned off at which time the incoming air is by-passed into the space 30 and circulated out through the vent 14 so that sufficient air will be provided to keep the animals alive even though the air is not forced to permeate the water.

The air is introduced into the coil by way of the nipple 20 either directly by a funnel 31 which may be attached direct to the nipple or by way of a hose 32 which is attached to the funnel and nipple. The hose is of appropriate length so that when used in connection with an automobile where the device is placed on the interior of the automobile, it may be placed out of the open window as illustrated in Figure 1.

In this connection I call attention to a flexible band or anchoring loop 33 which is adapted to be placed between the edge of the door and the frame of the door and the door closed to clamp the loop in such a position as to hold the nozzle in the manner shown in Figure 1 so that as the car is driven along the road at a relatively high speed, the air forcibly enters the bucket by way of the coil. Inasmuch as the coil is cooled by dry ice it is obvious that the air is in turn cooled. Moreover, the incoming air rushing into the water causes the water to swirl, thereby equally distributing the air and charging the water so that it is oxygenated to preserve the animals, whether they be live bait, fish, or the like.

I wish to call attention to the fact that it is possible with a structure of this kind to carry it conveniently in the back of the car as shown in Figure 1. In other cases, it may be placed on the running board and held in a rack (not shown) as is obvious, under which conditions the hose 32 is dispensed with and the funnel attached directly to the nipple 20.

It will be noticed that the cover 15 is of dished formation to trap any water which may be spilled when traveling on rough roads. In Figure 3, the numeral 34 merely designates a grip carried by the cover to facilitate its removal. Moreover, the numeral 35 designates an ordinary carrying bail for the bucket.

The numeral 36 in Figure 9 designates a separate cooler unit. This is in the form of a can 37 of appropriate proportions having internal and external coverings 38 and 39 of heat insulation material. The coverings are primarily to preserve the ice but serve also to protect the hands of the user against burning through the use of dry ice. The closure 40 is provided with a suitable handgrip 41 and an appropriate lining 42. The numeral 45 designates a lead weight attached to the bottom of the can to permit it to set upright in the water in the bucket.

The numeral 46 designates an appropriately covered removable cap to expose the metal surfaces 47 and 48 as shown in Figure 10.

The buoyant unit 36 is designed, as before indicated, to contain and carry a quantity of dry ice which is placed therein when the trip is started. The cap 46 is then in place and the closure 40 is of course closed. This permits the device 36 to be conveniently handled without injury to the user's hands, and at the same time preserves the dry ice.

When the fishing pond or other body water is reached, the fisherman removes the closure 15 and simply drops the buoyant ice laden can 36 into the water in the bucket. It floats conveniently. Before doing this however, it is necessary to remove the cap 46. Just as soon as the metal surfaces 47 and 48 strike the relatively warm water the surfaces become frosted, whereby to permit said device 36 to function as a lump of ice for cooling and keeping the water cool.

It is advisable to add water from the pond to the water in the bucket from time to time in order to keep the water in the bucket charged with air and it also aids in lowering the temperature of the water. Thus, fish which have been captured and placed into the bucket can be successfully maintained.

When starting the trip home, the device 36 is of course removed from the water 22 in the bucket and the cover 15 replaced so that said water will be kept cool and properly charged with air in order that the fish will survive the journey home. This makes it easy to transport live bait from the home to the point of fishing and to return the catch in a live state for commercial or consumption purposes, as is evident.

It is of course obvious that when I use the term "dry ice" I have reference to a particular product sold as such in the trade though I wish to comprehend the use of ordinary ice or any other type of refrigerant. The main idea is in providing the removable cover with the container for a refrigerant wherein this container or cup has a coil through which the incoming air, under pressure, is circulated and then introduced by way of a valved nozzle below the surface of the water. This serves to cool the water and charge it with sufficient air for oxygenation purposes.

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. A device of the class described comprising a water containing bucket provided in its top with an air discharge vent, a removable cover for said bucket, said cover being formed with a cup for reception of dry ice, a removable cover for said cup, an air delivery pipe having an air cooling coil confined in said cup, and an air intake nipple extending out through one wall of the cup, the inner end of said pipe depending into the water in said bucket and terminating in an air discharge nozzle, and an air intake funnel attachable to said nipple.

2. A device of the class described comprising a water containing bucket provided in its top with an air discharge vent, a removable cover for said bucket, said cover being formed with a cup for reception of dry ice, a removable cover for said cup, an air delivery pipe having an air cooling coil confined in said cup, and an air intake nipple extending out through one wall of the cup, the inner end of said pipe depending into the water in said bucket and terminating in an air discharge nozzle, and an air intake funnel attachable to said nipple, together with a hose of suitable length attachable to the funnel and nipple, and a loop-like flexible retaining strap associated with the hose whereby to permit said strap to be clamped between a door and its frame for the purpose described.

3. A portable transporting aquarium for aquatic animals comprising a portable water containing bucket convenient of accommodation and carriage in an automobile, said bucket being provided with a removable closure, an air delivery pipe co-ordinated with the bucket and adapted to deliver air into the bucket beneath the normal water level, a flexible adapter hose connected to the outer end of said pipe, and a funnel connected to the outer or intake end of said hose, said funnel being adapted for location on the exterior of the automobile and opening in a direction of the line of travel, and means carried by the hose and located adjacent the funnel whereby to permit the funnel to be located exteriorly and the hose to be detachably connected with a supporting part of the automobile.

4. A minnow bucket comprising a container for the water, said container being of a portable type and adapted to be carried in an automobile, an air intake and trapping funnel adapted for location externally of the automobile and designed to pick up air currents while said automobile is in motion, a closure for said container provided with a refrigerant holder, an air delivery pipe associated with said holder and having its inner end disposed in said container to deliver the air into the water below the normal water level, a flexible connection between the funnel and intake end of said pipe, and a retainer for said flexible connection adapted to be clamped in the automobile door in the manner described.

5. A transporting aquarium of the class described comprising a water containing bucket adapted to be carried in an automobile, a refrigerant containing cup supported on said bucket, a conduit to conduct air into said bucket, said conduit including an air cooling coil located in said cup, and a flexible portion adapted for disposition on the exterior of the automobile, an air trapping funnel on the intake end of said conduit, and means for holding the funnel on the exterior of the automobile so that air will be forced into the funnel.

6. A portable transportation aquarium of the class described comprising a water containing bucket of a size capable of being conveniently carried by hand and successfully placed and carried in a motor vehicle, a flexible conduit connected to said bucket to conduct air to the interior thereof, said conduit being adaptable for expeditious location in respect to adjacent parts of said vehicle, a funnel on the intake end of said conduit to conveniently feed air into the conduit, and hand adjusted means associated with said conduit for holding the funnel on the outside of said vehicle so that air will be forced through the funnel and conduit into said bucket.

ALBERT S. HAISLIP.